April 14, 1964 W. FRITZSCHE ETAL 3,129,339
PULSE CONTROLLED ELECTRONIC VOLTAGE CONTROL SYSTEM
Filed Feb. 16, 1959 2 Sheets-Sheet 1

Inventors:
WILFRIED FRITZSCHE
HANS LANGHEINRICH
By Toulmin & Toulmin
Attorneys

United States Patent Office 3,129,339
Patented Apr. 14, 1964

3,129,339
PULSE CONTROLLED ELECTRONIC VOLTAGE
CONTROL SYSTEM
Wilfried Fritzsche and Hans Langheinrich, Berlin-Charlottenburg, Germany, assignors to Licentia Patent-Verwaltungs-G.m.b.H., Hamburg, Germany
Filed Feb. 16, 1959, Ser. No. 793,423
Claims priority, application Germany Apr. 23, 1958
2 Claims. (Cl. 307—88.5)

This invention relates to an electronic control system for periodically initiating switching measures on the receipt of an adjustable number of pulses not exceeding $(2^n-1)$ with $n$ transistor flip-flop units, wherein $n$ is an integer equal to 2 or higher.

The object of our invention is to provide an electronic control system which makes it possible to utilize all combinations of different states of energization of the said number of flip-flop units and, by thereby freeing the operation from the limitations of decadic systems, to enable setting to a far greater number of pulses, which pulses serve for initiating switching measures, than was hitherto possible with the known systems of this type.

This problem of periodically releasing switching measures after a certain number of pulses have been received, also arises in solving different kinds of technical problems, especially those relating to measuring or counting technique. In the past, this problem was originally solved with the aid of electro-mechanical control mechanisms. However, such control mechanisms operate relatively slowly, because masses have to be moved therein. Consequently, such control mechanisms were replaced by purely electronic control devices. In doing so, however, the decade principle of the electro-mechanical counters was retained, i.e. the electronic control means were wired in such a manner that, whenever the pulses had filled a decade, a control pulse was always transferred to the next decade stage, while the decade filled by the pulses commenced again from zero. For such electronic counting stages, flip-flop units are used which are each capable of adopting two different states. In order to be able to characterize the ten steps of a decade, four flip-flop units are required. These are, however, not fully utilized as they would allow altogether 15 different combinations, while only 10 are used under the decadic principle.

The electronic control system according to the invention for periodically releasing switching measures after the receipt of an adjustable number of pulses not exceeding $(2^n-1)$ with $n$ transistor flip-flop units according to the invention is, as compared with these known systems, characterized in that, in the controlling system the voltage path feeding the switching member, is conducted over a high ohmic resistance and, via interposed diodes, is guided over the resistances in the collector circuit to those transistors which are to be in a blocked state after the reception of the number of pulses at which the switching is to take place. For setting a determined number of pulses $m$ (wherein $2^n-1$ is larger than $m$, and $m$ is an integer larger than 0) at which the switching is to take place, the base of each transistor is connected to one of two banks of contacts provided with a maximum of $2^n-1$ contacts, in such a manner that a resetting pulse released in a resetting device by the $2^n$th pulse, reverses the transistor into a state corresponding to the $(2^n-m)$th pulse. This is effectuated with the aid of a contact arm set to that contact in said contact bank which is co-ordinated to the respective number of pulses or to a value corresponding thereto. When building up the electronic transistor circuit in a consequent fashion, the resetting device, which supplies the resetting pulse, will be composed of transistors. These transistors can be so connected that, if they receive no positive releasing pulse, the first transistor is conductive and the second transistor is non-conductive, and that a positive releasing pulse, by temporarily blocking the first transistor, produces a negative pulse which renders the second transistor conductive so that it emits a positive reset pulse. An electronic gate control unit with two transistors in flip-flop connection will also be employed as a switching member.

If the release of the switching measures is to be dependent upon time, pulses with a constant frequency will be transmitted to the electronic controlling system, which pulses can be produced by a conventional pulse generator. To produce an output signal voltage which is independent of the oscillations of the feed voltage, it is advantageous to pass the feed voltage over the parallel connection of a resistance with collector and emitter of a transistor, the base current of which transistor is controlled by the base potential of a second transistor, the base potential of the latter transistor increasing with the increase in the emitter-base voltage of a third transistor according to the voltage to be kept constant, so that the parallel connection becomes more highly resistant.

The electronic control system according to the invention will be described in greater detail as applied to an embodiment. The purpose of this embodiment is the measuring of speeds, i.e., the counting of the number of revolutions in a given time unit.

The following description of this embodiment will be more clearly understood with reference to the accompanying drawing, in which FIGURE 1 shows a block diagram of the electronic control system according to the invention;

Figure 1:
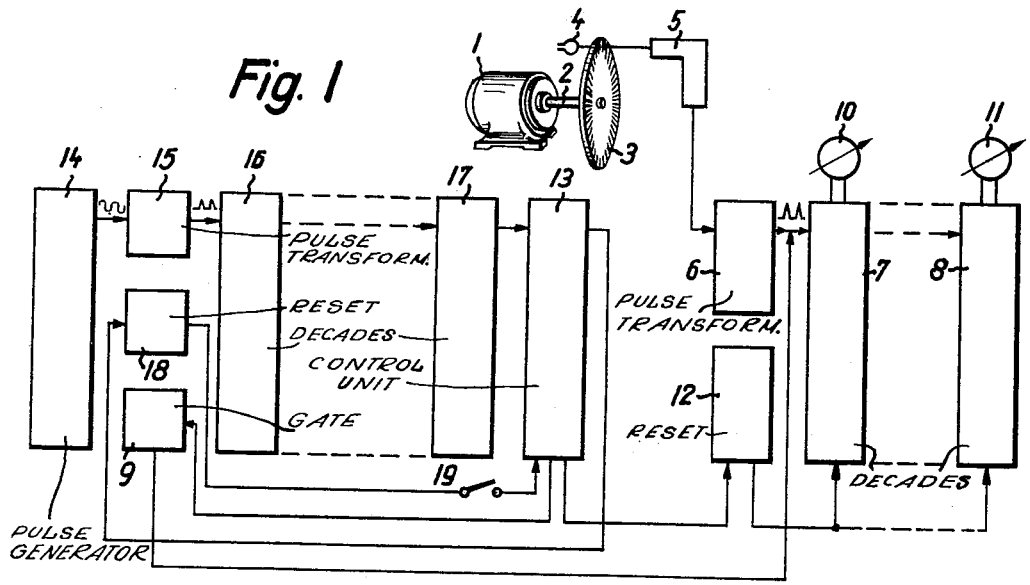

More in detail, FIGURE 1 shows a block diagram of the preferred embodiment of the invention serving for attaining the object of the invention specified above. This object consists in measuring the number of revolutions of the shaft 2 of a motor 1. To this end, a slotted disc 3 is mounted on the shaft 2, in a manner known per se. This disc 3 projects into the path of a light beam projected by a source of light 4 onto a photoelectric cell 5, so that only discontinuous light pulses are admitted to the photoelectric cell 5. Consequently, the latter only emits electric pulses approximately rectangular in shape which are applied to a pulse transformer 6, known per se. Pulse transformer 6 transforms the pulses into a pulse shape suitable for controlling the counting decades 7 to 8. These decades 7 to 8, however, can only count if there is a suitable bias applied at the input of the counting decade 7. If this bias voltage, which is derived from the gate 9, is negatively too strong, the positive pulses cannot produce positive voltages in the decades with the result that the decades will not count. In this case gate 9 is closed. As soon as gate 9 is opened, the pulses will be counted in the counting decades and the counted result is then indicated in the indicating instruments 10 to 11. If, for example, 120 holes are provided in the slotted disc 3, the number of pulses indicated on the instruments 10 to 11 is a measure of the speed of shaft 2 in revolutions per minute, when gate 9 is opened each time for half a second. For this reason the gate is so controlled that it is always closed for half a second and remains open for half a second. As long as the gate is closed the counted value can remain indicated on instruments 10 and 11 to facilitate the reading. Thereafter, the counting decades are reset to zero by the resetting device 12. Both this device 12 and also the gate 9 are controlled by the electronic control system 13 according to the invention.

A counting arrangement, in which this control system is employed is described, for example, in our pending application having the Serial No. 793,599, filed of even date.

Figure 2:
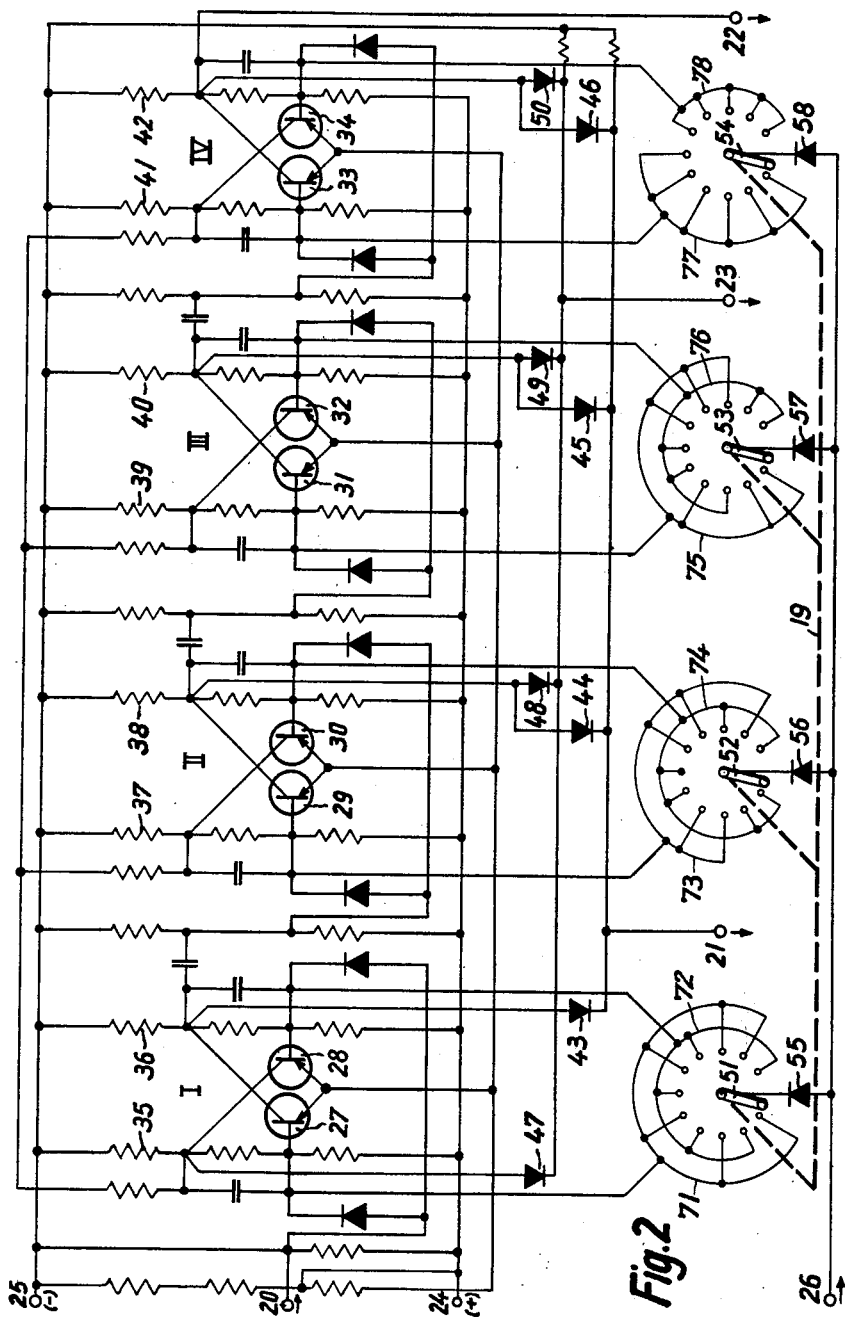
FIGURE 2 illustrates in detail a wiring diagram of the embodiment the block diagram of which is shown in FIGURE 1.

The control system 13 according to the invention is illustrated in detail in FIGURE 2. The electronic control unit 13 receives its controlling pulses from a pulse generator 14 of known construction. The output pulses of the pulse generator 14 are brought into a shape suitable for the numerical reduction required in the decades, in a pulse transformer 15, also of known construction, and reduced in the stepping down decades 16 to 17 in the required ratio. The necessary resetting of the electronic control unit 13 is effected by a resetting device 18 which is also actuated in turn by the electronic control unit 13. The resetting device 18 is described in detail in connection with FIGURE 3, whereas the gate 9 is illustrated in FIGURE 4. The switch 19 serves for setting the number of pulses after the receipt of which the switching operations are to be released.

The reduced control pulses of the pulse generator 14, on coming from the reducing decade 17, are fed to the electronic control system shown in FIGURE 2 via the terminal 20. Terminal 20 is therefore the main input terminal of the control system 13. The gate 9 is connected to the terminal 21 and the resetting device 18 to the terminal 22 which is the main output terminal of a binary counter to be described below. A number-cancelling or extinguishing device for the counter decades 7 to 8, which device is described in our patent application supra, is connected to the terminal 23. The feed to the electronic controlling system is effected via the terminals 24 and 25 which are connected to likewise designated terminals of the voltage stabilizing unit shown in FIGURE 5. The resetting pulses from the resetting device 18 (FIGURE 3) are applied to the controlling system via the terminal 26. The electronic control unit 13 in the embodiment illustrated in FIGURE 2 comprises four flip-flop units I, II, III and IV, each of which comprises two transistors 27, 28; 29; 30; 31, 32; and 33, 34. It therefore is capable of adopting in all 16 switching positions and can consequently carry out 16 steps. Flip flops I to IV are interconnected so as to form a binary counter; this type of circuit, in general, is known per se. Contrary to the conventional decade circuits with feed-back leads, a selection can be made from among 15 pulses. Accordingly, the length of time during which the counting results appear on the indicating instruments 10, 11 is adjustable over a wide range. The transistors 27 to 34 of the four flip-flop units are connected with their collectors alternating to one of two diode circuits 43 to 46 and 47 to 50 respectively. They are connected up with the minus pole 25 of the source of feed voltage, via the high ohmic resistances 35 to 42. The pulses for controlling the gate 9 enter the two diode circuits via the terminal 21 and the control of the resetting device 12 via the terminal 23. It will be observed, that diodes 43 to 46 together with the ohmic resistor connecting them with the negative voltage terminal 25 form a logic "and" circuit with terminal 21 being the output terminal and the collectors of transistors 27, 29, 31 and 33 being four input terminals thereof.

It will further be observed that diodes 47 to 50 and the resistor connecting them to the negative voltage terminal 25 form another logic "and" circuit having an output terminal 23 and having four input terminals being composed of the collectors of transistors 28, 29, 37 and 33. If now the flip-flop units I to IV are in a position in which the odd-numbered transistors are blocked and the even-numbered transistors are conductive, a strong negative voltage will exist on the cathode point of the lower diode circuit 43 to 46. This voltage is also present via the terminal 21 at the input terminal of the gate control unit 9, so that, if the gate is connected accordingly, this gate is open. Let it be assumed, that the position of the transistors in question has just been brought about by the 15th pulse. The next pulse, that is the 16th pulse, effects a reversal of all flip-flop units to the zero position, in which the even-numbered transistors are just blocked. This means, however, that a weak positive voltage is also applied on the cathode point of the lower diode circuit with the rectifiers 43 and 46. This positive voltage is sufficient, when the gate 9 is suitably connected up, to close this gate. Consequently, the gate initiates the desired switching measure, that is, in the case of the embodiment, the interruption of the counting by the counting decades 7 to 8. The weak positive potential on the cathode point of the lower diode circuit is maintained in all positions except the position caused by the 15th pulse. The gate 9 therefore remains closed in the positions "0" to "14." In the case of the position corresponding to the 14th pulse, the transistors 28, 29, 31 and 33 are blocked. This means that a strong negative voltage exists at the cathode point of the upper diode circuit with the rectifiers 47 to 50. On receiving the 15th pulse, that is when changing over from the position "14" to position "15," the potential on this cathode point of the diodes 47 to 50 increases from strong negative to weak negative voltage. This rise in voltage acts as a positive pulse. It is imparted to the input of the resetting device 12 via the connecting terminal 23 in the example under consideration. After amplification in this device 12 it shifts back to zero all decades 7 to 8 of the counter, and the counting can commence afresh. This resetting step is completed before the first counting pulse of the new counting operation passes through the gate 9, so that there is no danger of a few pulses of the next counting operation being lost between the resetting step and the commencement of the next counting operation. The standard symbols in the diagrams of the flip-flop units denote conventional electrical components which are not referred to by reference numerals, but function in the conventional and known manner for effecting the necessary change-over.

The selector switch 19 serves for setting the number of pulses at which certain switching measures are to be initiated. This switch 19 consists of contact arms 51 to 54, one coordinated to each flip-flop unit, which are connected via rectifiers 55 to 58 with the terminal 26, via which terminal 26 the control unit is connected with resetting device 18. Each of these contact arms 51 to 54 sweeps over contacts connected to one of two contact banks 71 to 78. Each transistor of a flip-flop unit is connected to one of these contact banks. The selector switch 19 ensures that a resetting pulse entering the controlling unit does not bring about a state corresponding to the position "0," but to the desired state to which the switch 19 has been set. In the chosen example, the gate 9, through the controlling unit, only opens between the 15th and 16th pulses. The 16th pulse, which is identical with the 0th pulse, effects the termination of the counting operation in the counting decades 7 and 8. The counted result obtained remains standing from the 0th to the 15th pulse. If, by correspondingly adjusting the switch 19, the resetting pulse does not cause the transistors of the flip-flop units I to IV to be reversed to their zero position but to assume the position that would be imparted to them for example by the 14th pulse, the gate 9 is only closed for the length of time between two pulses. Accordingly, the measured or counted result will be shown only during this time. It is, therefore, possible, by correspondingly setting the switch 19, to predetermine the time during which the result is to remain indicated. At the same time, the beat according to which the decades 7 to 8 are to count is also determined by adjusting the switch 19.

The advantages of the control system according to the invention over the known purely decadic controlling systems will become apparent from the following considerations. If the time-proportional pulses admitted to the controlling system follow each other at intervals of half a second, the cycle of 16 pulses will be passed through in eight seconds. By suitably presetting the switch 19, it is possible to effect that the counted or measured result remains visible for periods between 0.5 second and 7.5 seconds. If under the same conditions, a known decadic circuit is used, the entire pulse cycle will be passed through in 5 seconds. The time for reading the measuring or counting results can therefore only be varied between 0.5 and 4.5 seconds. Therefore, the counting beat can also only be predetermined within a correspondingly narrow range.

Figure 3:
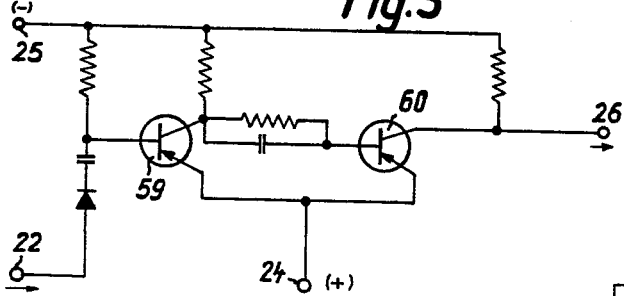
FIGURE 3 shows the resetting device employed in FIGURE 1.
Figure 5:
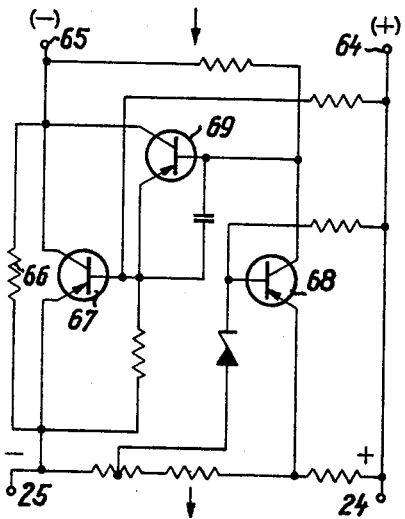
FIGURE 5 illustrates a stabilizing circuit arrangement serving for stabilizing the feed voltage of the embodiment shown in FIGURES 1 and 2.
Figure 4:
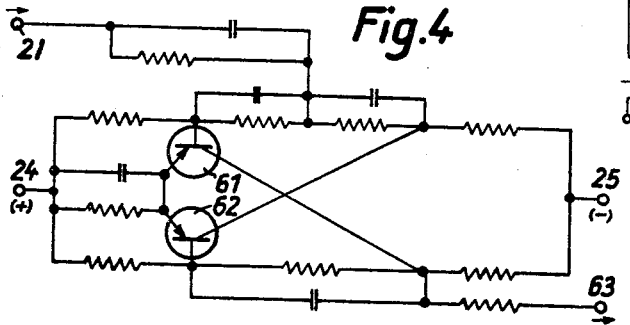
FIGURE 4 shows the gate circuit employed in FIGURE 1.

The resetting device which is designated by reference numeral 18 in FIGURE 1 and which effects the resetting of the control system is illustrated in FIGURE 3. It is connected up by the terminals 24 and 25 with a voltage stabilizing circuit as shown in FIGURE 5. The resetting step is initiated by a positive pulse occurring at the terminal 22. This pulse blocks the transistor 59 which is normally in conductive state, whereas in normal state the transistor 60 is blocked. The blocking of transistor 59 produces a negative pulse at the base of transistor 60. This transistor 60 will thereby become momentarily conductive, so that a short positive pulse occurs at its output. This pulse is fed to the flip-flop transistors 27 to 34 of the control system via the terminal 26 and switch 19. The transistors receiving this pulse are thereby blocked. It is advisable to use for the transistor 60 a transistor having a very small leakage current, for example a silicon transistor. In the case of a transistor with larger leakage current there is a danger that it will interfere with the flip-flop operation. The gate circuit 9 fed by the control system and adapted for directly releasing the switching measures, is illustrated in FIGURE 4. This gate circuit 9 is connected by way of the terminals 24 and 25 to the stabilized voltage source. The output pulse occurring at the terminal 21 is amplified by the flip-flop unit composed of the transistors 61 and 62 and fed via the terminal 63 to the switching members to be controlled. In the illustrated embodiment, the voltage occurring at the terminal 63 determines the input voltage of the counting decade 7.

The feed voltage can be kept constant by the circuit arrangement illustrated in FIGURE 5. The voltage from, for instance, the public electrical line, after being transformed to the necessary value and rectified, is fed to this stabilizing circuit via the terminals 64 and 65. In the negative voltage line there is interposed the parallel circuit of a resistance 66 and a transistor 67. This transistor 67 is so controlled that the output voltage remains constant at the terminals 24 and 25. If this output voltage increases somewhat, the emitter-base voltage of the transistor 68 will also rise slightly. This transistor will therefore become somewhat more conductive. However, through the increase in conductivity of the transistor 68, a positive voltage is produced on the base of the transistor 69. For with regard to transistor 69, transistor 68 acts like a decreasing ohmic resistance. The result of this is that the transistor 69 blocks. Thereby it reduces at the same time the base current of the transistor 67 so that this transistor also becomes more highly resistant. Consequently, the drop in voltage in the parallel circuit of transistor 67 and resistance 66 becomes greater and, as a result, the output voltage is reduced. A corresponding reverse operation takes place in the case of a reduction of the output voltage at terminals 24 and 25.

The electronic control system according to the invention therefore enables the greatest possible utilization of the states of switching rendered possible by the number of flip-flop units employed, and consequently the adjustment of the desired switching measures over a greater number of pulses than is possible in the case of the known systems.

It will be understood that this invention is susceptible to modification in order to adapt it to different usages and conditions, and, accordingly, it is desired to comprehend such modifications within this invention as may fall within the scope of the appended claims.

We claim:

1. Pulse controlled electronic voltage control system comprising: a plurality of $n$, bistable multivibrators each having two transistors, each transistor having an input terminal and an output terminal for each multivibrator; circuit means for interconnecting said terminals so as to define a binary counting circuit having a main input and a main output terminal whereby each combination of conduction and blocking of said counting circuit represents a number; a plurality of $n$ diodes, each diode being connected to one terminal of a multivibrator; circuit means combining said diodes to a logic "and" circuit producing an output voltage appearing in between two pulses applied to said main input terminal changing the state of the counter to successive number; $n$, ganged, rotating selector switches, each having one input terminal, two output terminals and means for selectively connecting the input terminal of each switch to one output terminal thereof; circuit means for connecting said two terminals of each multivibrator to said two output terminals of a switch whereby with each setting of said selector switches, the input terminals thereof are connected to a different combination of terminals of said multivibrators; and circuit means including diodes for connecting said main output terminal to all of said input terminals of said selector switches.

2. Electronic device, comprising: a first pulse counter including means for resetting such counter upon receiving of a resetting pulse further including indicating means connected for indicating any counted result; gating means for rendering said first counter responsive to pulses to be counted; a plurality of $n$, transistorized, bistable multivibrators each having two terminals, circuit means for combining said terminals of said multivibrator so as to form a binary counter having a main input and a main output terminal; $n$ diodes forming a first logic "and" circuit, each diode being connected to one terminal of a multivibrator, a second plurality of $n$ diodes forming a second logic "and" circuit each diode thereof being connected to one terminal of a multivibrator whereby said first logic "and" circuit and said second logic "and" circuit are connected to a different combination of input terminals of said multivibrator; first circuit means for connecting said first logic "and" circuit to said gating means for controlling thereof; second circuit means for connecting said second logic "and" circuit to said resetting means; and a selective switching device interconnecting one of said terminals of each multivibrator with said main output terminal so as to place said multivibrators into predetermined states of blocking and conduction when a pulse from said main output terminal is permitted to pass through said switching device.

References Cited in the file of this patent

UNITED STATES PATENTS

| | | |
|---|---|---|
| 2,605,306 | Eberhard | July 29, 1952 |
| 2,749,437 | Parr | June 5, 1956 |
| 2,903,676 | Ostendorf | Sept. 8, 1959 |
| 2,945,183 | Hartke et al. | July 12, 1960 |
| 2,970,226 | Skelton et al. | Jan. 31, 1961 |
| 2,973,438 | Clark | Feb. 28, 1961 |

OTHER REFERENCES

Millman et al.: Pulse and Digital Circuits, 1956, McGraw-Hill Pub. Co., page 345.